(12) United States Patent
Brigham et al.

(10) Patent No.: US 7,717,202 B2
(45) Date of Patent: May 18, 2010

(54) VEHICLE PROPULSION SYSTEM WITH SELECTABLE ENERGY SOURCES AND METHOD OF USE

(75) Inventors: David Richens Brigham, Ann Arbor, MI (US); Douglas Bradley Bell, Farmington Hills, MI (US); Mark John Jennings, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 11/843,107

(22) Filed: Aug. 22, 2007

(65) Prior Publication Data

US 2009/0050383 A1 Feb. 26, 2009

(51) Int. Cl.
*B60W 10/00* (2006.01)

(52) U.S. Cl. .............................. 180/65.265; 180/65.285; 180/65.31

(58) Field of Classification Search .............. 180/65.31, 180/65.24, 65.25, 65.265, 65.23, 65.26, 65.285, 180/65.28
See application file for complete search history.

(56) References Cited

U.S. PATENT DOCUMENTS

| | | | |
|---|---|---|---|
| 3,975,913 A * | 8/1976 | Erickson | 60/645 |
| 5,765,656 A | 6/1998 | Weaver | |
| 5,785,136 A | 7/1998 | Falkenmayer et al. | |
| 6,253,866 B1 | 7/2001 | Kojima | |
| 6,459,231 B1 * | 10/2002 | Kagatani | 429/17 |
| 6,536,547 B1 | 3/2003 | Meaney, Jr. | |
| 6,565,836 B2 | 5/2003 | Ovshinsky et al. | |
| 6,820,706 B2 | 11/2004 | Ovshinsky et al. | |
| 6,892,840 B2 | 5/2005 | Meaney, Jr. | |
| 6,945,345 B2 | 9/2005 | Meaney, Jr. | |
| 7,013,205 B1 | 3/2006 | Hafner et al. | |
| 7,036,616 B1 | 5/2006 | Kejha | |
| 7,389,839 B2 * | 6/2008 | Meaney, Jr. | 180/65.265 |
| 7,520,350 B2 * | 4/2009 | Hotto | 180/65.25 |
| 7,556,113 B2 * | 7/2009 | Amori et al. | 180/68.5 |
| 2006/0101823 A1 | 5/2006 | Takemoto et al. | |

(Continued)

FOREIGN PATENT DOCUMENTS

EP 1 158 147 A2 11/2001

(Continued)

OTHER PUBLICATIONS

Search Report under Section 17, dated Dec. 11, 2008, 1 page.

(Continued)

*Primary Examiner*—Hau V Phan
(74) *Attorney, Agent, or Firm*—David B. Kelley; Brooks Kushman P.C.

(57) ABSTRACT

A propulsion system includes a first torque producing arrangement including an electric machine configured to a first energy source supplying electrical energy to the electric machine. The system also includes a second torque producing arrangement having an engine connected to a second energy source configured to supply gaseous fuel to the engine. The system has a hydrogen production system having an electrolyzer, a water source, a hydrogen dispensing and loading system, and a connection to an electricity grid. Hydrogen is loaded to the second energy source when the electrolyzer is electrolyzing the water. The engine further connects to a third energy source configured to supply a non-hydrogen fuel to the engine. The system has a controller electrically connected to the motor and the engine capable of selecting the propulsion component and the fuel source.

20 Claims, 3 Drawing Sheets

U.S. PATENT DOCUMENTS

2006/0113129 A1   6/2006   Tabata

OTHER PUBLICATIONS

"Hydrogen-Fueled Vehicles: Hybrids vs. Fuel Cells", C.E. (Sandy) Thomas, Ph.D., 11 pgs.

"HEV with hydrogen internal combustion engine", Advanced Battery Technology, Aug. 28, 2006, 1 page.

"Hydrogen Economy", H2Gen Innovations, Inc., Aug. 28, 2006, 2 pages.

"An Affordable Hydrogen Transportation System", C.E. (Sandy) Thomas, Ph.D., H2Gen Innovations, Inc., 33 pages.

* cited by examiner

VEHICLE PROPULSION SYSTEM WITH SELECTABLE ENERGY SOURCES AND METHOD OF USE

BACKGROUND OF THE INVENTION

1. Field of the Invention

The invention relates to a vehicle propulsion system with selectable energy sources and its method of use.

2. Background Art

Today it is becoming increasingly desirable to reduce the use of gasoline to fuel transportation. A number of alternative fuel sources have begun to emerge. However, the variations of applications to which vehicles are generally put are typically satisfied only by inclusion of a gasoline powered internal combustion engine. A significant consideration is the ability to travel up to several hundred miles in one day. However, for most applications, a vehicle travels no more than about thirty miles a day.

As a consequence, hybrid and conventional vehicles capable of using an alternate energy source for propulsion technologies often combine propulsion technologies with gasoline powered engines for the few occasions when long distance travel is needed. Alternate propulsion technologies include electric motors and internal combustion engines fueled by different sources of energy. The different sources of energy are often constrained by the ability to store energy on the vehicle. One example of such a constraint is an energy battery that can act as a source of energy for an electric motor in the vehicle. For the energy battery to provide sufficient energy to power the vehicle for thirty miles every day, it must be relatively large. The problem is that the incremental cost of the large energy battery makes it a limited option for the average consumer. Many energy batteries used in vehicles today provide only about six miles of daily travel, according to the Environmental Protection Agency cycle driving method.

While many energy batteries used in vehicles today recharge from regenerative braking, it is desirable to have a method of completely recharging, such as plug-in recharging capabilities that use a standard household electric service provided from a commercial electrical grid.

An alternative source of energy that can be stored on a vehicle is hydrogen. Gaseous hydrogen is currently used in vehicles having a fuel cell or hydrogen-fueled internal combustion engine. U.S. Pat. No. 5,785,136 describes a hybrid drive arrangement having a thermal engine that can be operated on a fuel containing hydrocarbons, and is capable of generating hydrogen. The hydrogen is stored in a device on the vehicle. The source of hydrogen fuel for this vehicle is methanol passed through a reformer located on the vehicle. Reformer technology, and in particular the membranes on reformers, is an expensive option and subject to high maintenance needs. In addition, using methanol as an onboard fuel source would require fuel stations to have sources of methanol in addition to gasoline. This is not very economical for the service station providers.

What is needed is a hybrid vehicle propulsion system that is relatively inexpensive, relatively easy to use, and has controls, fuels, and propulsion components that cooperate to reduce the use of gasoline to fuel transportation, while having a gasoline-powered propulsion system available for certain transportation needs.

SUMMARY OF THE INVENTION

Embodiments of this invention relate to a vehicle propulsion system with selectable energy sources and its method of use.

One embodiment includes a vehicle propulsion system for a vehicle having a plurality of wheels. The system includes a first torque producing arrangement including an electric machine and a second torque producing arrangement including an engine, both operable to provide torque to at least one of the vehicle wheels. A first energy source is configured to supply electrical energy to the electric machine. A second energy source is configured to supply gaseous fuel to the engine. A hydrogen production system is connected to the second energy source and is capable of receiving electrical energy from an electricity grid external to the vehicle. The hydrogen production system includes an electrolyzer, a water source, and a hydrogen dispensing and loading system. The loading system is configured to provide hydrogen to the second energy source from the electrolyzer when the electrolyzer produces hydrogen from water received from the water source. The system further includes a third energy source configured to supply a non-hydrogen fuel to the engine. A control system operatively connecting to the first and second torque producing arrangements and including at least one controller is configured to select at least one of the torque producing arrangements and at least one of the energy sources.

In other embodiments, a vehicle propulsion system with selectable energy sources includes a first propulsion component having an electric drive motor operable to provide torque to at least one wheel of the vehicle. The first propulsion component is also selectably connected electrically to a plurality of energy sources. A first energy source is capable of receiving electrical energy.

A second propulsion component has an internal combustion engine. The second propulsion component also is connected to a gaseous fuel storage tank, which is capable of supplying hydrogen for fueling the engine. The second propulsion component further is connected to a third energy source for storing a non-hydrogen fuel capable of fueling the engine.

The propulsion system has at least one control system having a logic block and a controller, the controller adapted to select a combination including at least one of the propulsion components and at least one of the energy source as determined by the logic block. The combinations include at least three combinations selected independently from a group including the electric motor energized only by a battery, the electric motor energized by a fuel cell, the electric motor energized by the battery and the fuel cell the internal combustion engine fueled by hydrogen, the internal combustion engine fueled by hydrogen and a non-hydrogen fuel, the internal combustion engine fueled by a blend of hydrogen and a gaseous hydrocarbon, and the internal combustion engine fueled only by the non-hydrogen fuel.

Other embodiments of the invention include a method for using a vehicle propulsion system with selectable energy sources that includes quantifying a quantity of energy available for a first and a second short-range energy source. An algorithm is selected for ranking of at least three combinations of propulsion components and energy sources, including combinations having the first and second short-range sources. The priority for the use of each combination of propulsion system and energy source is determined using the algorithm. The selection of a first combination using a control system is made in priority order based on the algorithm. In the next step, the vehicle using the first combination is started, and the vehicle is driven until the first combination is depleted. Next, a second combination having a next highest priority is selected. The vehicle propulsion system is changed to the second combination. The vehicle is driven until the second combination is depleted. The short-range energy sources are re-energized by connecting an energy supply external to the vehicle for a time period. Examples of the energy supply may include, but are not limited to, an electricity grid, propane tank, and a natural gas pipeline.

DETAILED DESCRIPTION OF THE PREFERRED EMBODIMENT(S)

Reference will now be made in detail to compositions, embodiments and methods of the present invention known to the inventors; however, it should be understood that the disclosed embodiments are merely exemplary of the present invention, which may be embodied in various alternative forms. Therefore, specific details disclosed herein are not to be interpreted as limiting, but merely as a representative basis for teaching one skilled in the art to variously employ the present invention.

Except where expressly indicated, all numerical quantities in this description indicating the amounts of material or conditions are understood as modified by the word "about" in describing the broadest scope of the present invention. Practice within the numerical limits is generally preferred.

Figure 1:
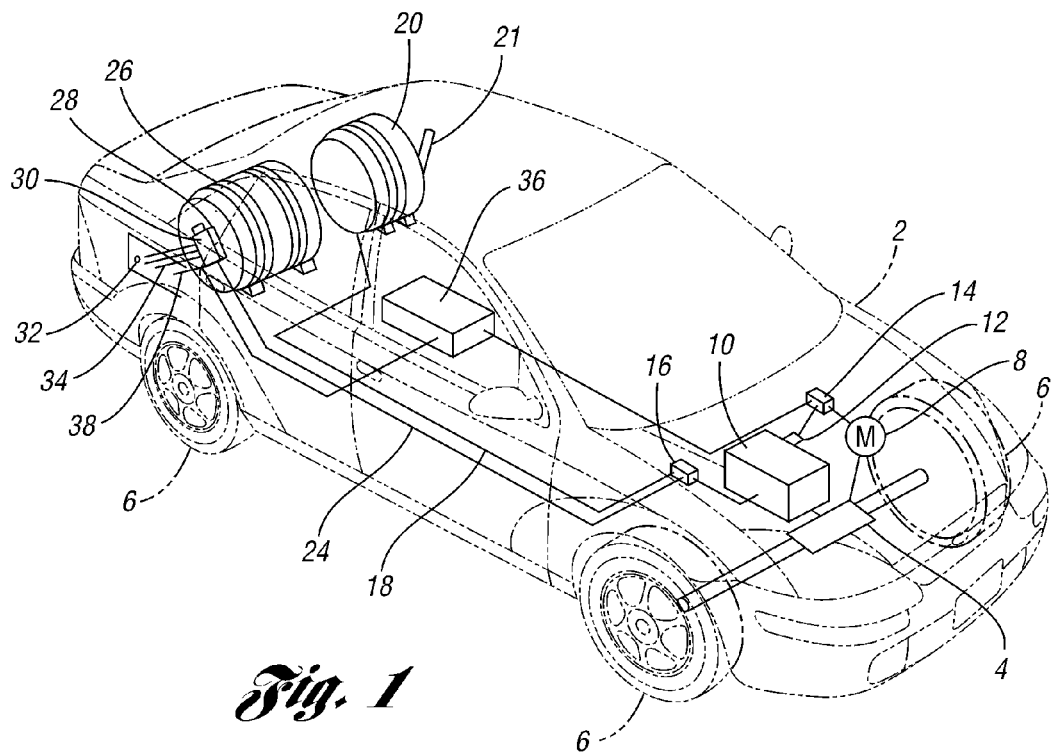
FIG. 1 illustrates a perspective view of a vehicle having a vehicle propulsion system with selectable energy sources in a parallel configuration according to at least one embodiment of this invention.

Referring now to FIG. 1, a vehicle 2 is illustrated in a non-limiting perspective view. The vehicle 2 has a power transmission system 4 connected to the wheels 6 (only three of which are visible) of the vehicle 2. In certain embodiments torque producing arrangements such as propulsion components, include a motor 8 is connected to the transmission 4. The motor 8 is electrically connected to an internal combustion engine 10. It is understood that while the motor 8 is illustrated as electrically connected, mechanical connections, such as mechanical transmissions, may also be used separately or in conjunction with the motor 8 without departing from the spirit of the invention. The engine 10 is capable of using, at least, hydrogen fuel, a non-hydrogen fuel, a gaseous hydrocarbon or a blend thereof. The engine 10 optionally drives an electric machine 12. Non-limiting examples of the electric machine 12 are an electric motor, an alternator or a generator. Hybrid vehicles or vehicles that store electrical energy may use certain electrical machines 12 for power transmission systems. The electrical output of the electric machine 12 is supplied to the motor 8. The selection of this electrical machine 12 may be governed by a propulsion system controller 14.

While the internal combustion engine 10 may be fueled with hydrogen, various hydrogen-gaseous hydrocarbon blends, or a non-hydrogen fuel like gasoline, certain engine settings may need adjustment when converting between fuels. For example, the engine 10, when operating using hydrogen, typically may receive the hydrogen through port injection into an intake manifold after the beginning of an intake stroke in order to minimize premature ignition. Pre-ignition conditions may also be curbed using thermal dilution techniques such as having exhaust gas (EGR) or water injection techniques (not shown).

As an example, multi-fuel engines may use a set of port fuel injectors for hydrogen, and an optionally different set of injectors for gaseous hydrocarbon fuel, including fuel blends, such as a hydrogen-gaseous hydrogen blend, and yet another set of cylinder injectors for direct injection of gasoline.

As a further example of adjustments needed to use the internal combustion engine 10 with multiple fuels and blends of fuel, the ignition systems that use a waste spark system need to be controlled when switching fuels. In the waste spark system, the spark is energized each time the piston reaches top dead center whether or not the piston is a compression stroke or on an exhaust stroke. For gasoline engines, waste spark systems work well and are less expensive than other systems. For hydrogen engines, the waste spark systems are a source of pre-ignition because of sparking on the exhaust stroke. That spark must be avoided during hydrogen fuel operation.

Due to hydrogen's low ignition energy limit igniting hydrogen is easy and gasoline ignition systems can be used. The very lean air/fuel ratios, such as 130:1 to 180:1 reduce the flame velocity considerably allowing the use of a dual spark plug system. Typical gasoline fuels and engines use an air/fuel stoichiometry of 14.9. Further it is typical for hydrogen engines to be designed to use about twice as much air as theoretically required for complete combustion at a selected air/fuel ratio. Air/fuel ratios may be selected to minimize the formation of $NO_x$. Unfortunately, these settings also produce a power output that is about half of a similarly sized engine fueled by gasoline. To make up for the power loss, the hydrogen engine may be equipped with and use a turbo charger or a supercharger.

Hydrogen can be used advantageously in an engine 10 as an additive to a hydrocarbon fuel. Gaseous hydrogen and gaseous hydrocarbon fuel may be co-stored if a fuel line sensor is used to detect a mixture proportion between the gaseous components. However, gaseous hydrogen cannot be stored in the same vessel as liquid fuel because of separation due to density differences. Further, if liquid hydrogen were stored in the same vessel as other fuels, hydrogen's low boiling point may freeze other fuels resulting in a fuel ice.

The fuel for the internal combustion engine 10 is controlled by a fuel controller 16, which is configured to control the type and amount of fuel provided to the engine 10. The controller 16 governs gasoline flow through a gasoline fuel line 18 that is located between the engine 10 and a gasoline storage tank 20. It is understood that other non-limiting examples of non-hydrogen fuels such as ethanol, hydrocarbons, natural gas or biodiesel may be used instead of gasoline without violating the spirit of this invention. Fuel is provided to the gasoline storage tank 20 through a fuel filler tube 21 connected to the gas tank 20 and is accessible from the exterior of the vehicle 2.

Hydrogen is provided to the engine 10 by a hydrogen fuel line 24 disposed between the engine 10 and a hydrogen storage tank 26. The fuel controller 16 governs hydrogen flow through the hydrogen fuel line 24. Attached to the hydrogen storage tank 26 is a hydrogen dispensing and loading system 28 connected to the hydrogen storage tank 26. The system 28 optionally includes a compressor (not shown). The hydrogen dispensing/loading system 28 allows hydrogen gas to be compressed into or released from the storage tank 26. While the embodiment discussed here refers to hydrogen gas as an energy supply in the storage tank 26 and with the dispensing/loading system 28, it is understood that the gaseous fuel may include blends of gaseous components like gaseous hydrocarbons with hydrogen such as propane, butane, and natural gas. These may be co-stored in the storage tank 26. It is further understood that the gaseous components may be loaded and dispensed independently or together. The loading operation sources for these gaseous components may be different or the same without departing from the spirit of the invention.

Connected to the hydrogen dispensing/loading system 28 is an electrolyzer 30. The electrolyzer 30 may be supplied with power from a household electricity supply through a plug 34. The hydrogen source for the electrolyzer 30 is a water supply 32. The water for the supply 32 may include, for example, water available from a household tap. The hydrogen storage tank 26 may be filled during a recharging exercise by the electrolyzer 30 when the electrolyzer 30 decomposes the water to hydrogen gas and oxygen by electrolysis. It is understood that the electricity supply may come from any of a number of different sources. Non-limiting examples of these sources may include a commercial electricity grid or a local household supply such as a fuel cell, a local generation operation, such as a household hydrogeneration station, or a solar power bank.

It is further understood that the electricity supply may be delivered in a number of locations besides the household without violating the spirit of this invention. Non-limiting examples may include commercial, such as a "park and plug," parking structure providing outlets for recharging while the vehicle 2 is parked, industrial sites, like battery charging stations, or retail power stations.

In the embodiment shown in FIG. 1, energy storage battery 36 is connected to a plug 38 accessible from the extension of the vehicle 2, and it is connected to the propulsion system controller 14. The plug 38 allows the battery 36 to be recharged by standard household electrical energy provided from the commercial electrical grid. It is understood that conversion devices from an alternating current of the commercial electrical grid to the direct current typically used in automotive systems may be present without violating the spirit of this invention. Regeneration braking systems or the like may also provide electrical energy to the battery 36 while keeping within the scope of the present invention.

In this embodiment the propulsion system controller 14 decides whether to use electrical energy from the battery 36 to power the motor 8, or to use electrical energy coming from the energy generating device 12 associated with the internal combustion engine 10. In this embodiment the internal combustion engine 10 can derive its fuel from the gasoline storage tank 20 or the hydrogen storage tank 26. The selection of which fuel to use is made by the fuel controller 16.

It is understood that controllers such as the system controller 14 and the fuel controller 16 may be integrated into a single controller. A non-limiting example of such an integrated controller is a vehicle system controller/powertrain module described below.

It is understood that certain embodiments, such as the non-limiting embodiment shown in FIG. 1, may show a parallel configuration of energy sources to supply the motor 8. In certain embodiments the internal combustion engine 10 may be directly connected to the transmission 4 to provide an input to the transmission 4, such as in a conventional car or truck. In other embodiments the internal combustion engine 10 can provide electrical energy from the electric energy generating device 12 directly to the battery 36. These embodiments are described as a series configuration.

Figure 2:
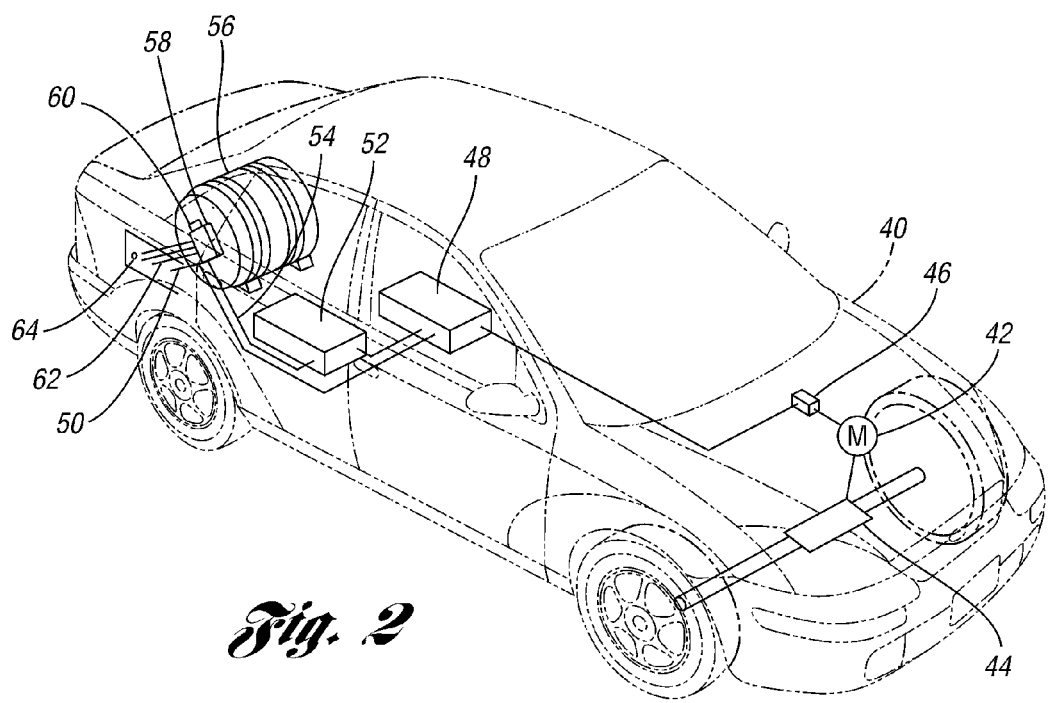
FIG. 2 illustrates a perspective view of a vehicle having a vehicle propulsion system with selectable energy sources in a configuration according to at least one embodiment of this invention.

Referring now to FIG. 2, an alternative embodiment of the invention is illustrated. In the vehicle 40, electrical motor 42 is connected to the transmission 44 and electrically connected to the propulsion system controller 46. The controller 46 is electrically connected to the battery energy storage device 48. The energy storage device 48 may be recharged using the plug 50, which may be connected to the commercial electrical grid external to the vehicle.

An alternative recharging method includes the use of a fuel cell 52 which is electrically connected to the battery 48. The fuel cell 52 is fueled by a hydrogen fuel line 54 which is attached to the fuel cell 52 and the hydrogen storage tank 56. The controller 46 may have a logic block including a recharging algorithm to select whether recharging occurs of the fuel cell 52, the battery 48, or a combination of both. It is understood that other electrical devices may be used for recharging the fuel cell 52, the battery 48, or the combination of both without violating the spirit of this invention. Non-limiting examples of the recharging devices include regenerative braking systems, alternators or generators. It is also understood that the controller may be a single controller unit or may be several controllers in communication with each other. It is further understood the logic block may be disposed on one or more controllers. An example of the controller may be a vehicle system controller/powertrain control module (VSC/PCM). In certain embodiments, the power control module may include software embedded with the VSC/PCM or may be a separate hardware device. Further, in this example controller area network (CAN) may allow the VSC/PCM to communicate with a transmission and/or a battery control module. In another example, the VSC/PCM may include an engine control unit (ECU) that may perform control functions on the engine 30.

Attached to the hydrogen storage tank 56 is a hydrogen dispensing/loading system 58. The hydrogen dispensing/loading system 58 allows the hydrogen gas to be compressed into and released from the storage tank 56. Connected to the hydrogen dispensing/loading system 58 is an electrolyzer 60. The electrolyzer 60 is, in this embodiment, supplied with electrical power from a household through a plug 62. The hydrogen source for the electrolyzer is water from a water supply 64, typically the household water supply. The hydrogen storage tank 56 may be filled during a recharging operation of the fuel cell 52 and/or the battery 48 by the electrolyzer 60 when the electrolyzer 60 decomposes the water to hydrogen gas and oxygen using electrolysis. The energy to make that conversion of water to hydrogen and oxygen is provided by electricity received when the plug 62 is connected to the commercial electrical grid external to the vehicle.

The fuel cell 52 may be supplied with hydrogen from the hydrogen storage tank 56 by the hydrogen fuel line 54 connecting the fuel cell 52 with the hydrogen storage tank 56. The fuel cell 50 is electrically connected to the battery 48, and is capable of recharging the battery 48. This is an example of a series configuration. It is understood that a parallel configuration where the fuel cell 52 directly powers the motor 42 with or without the propulsion controller 46 is within the spirit of the invention.

Figure 3:
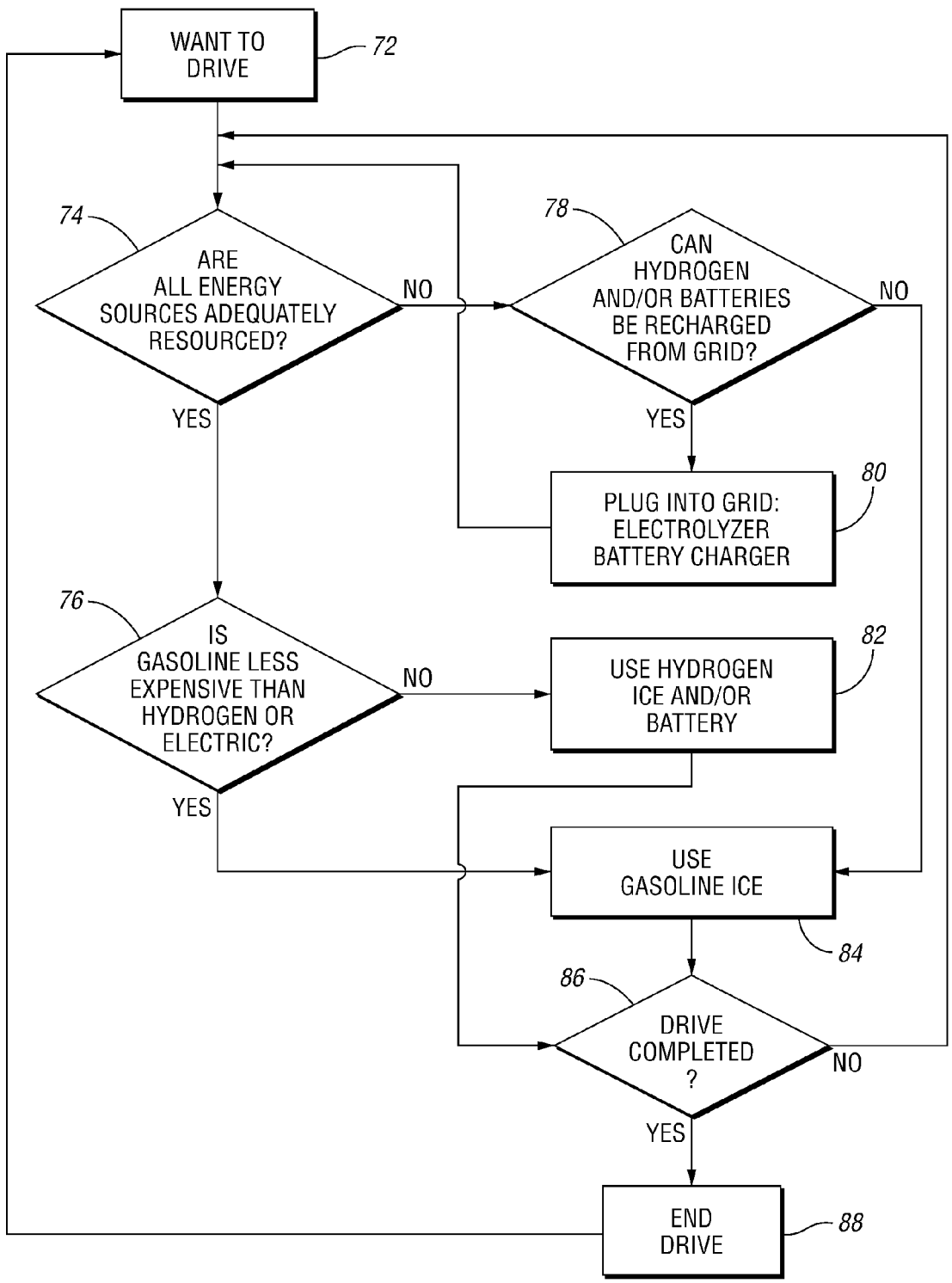
FIG. 3 illustrates a control logic for a method of using the vehicle propulsion selection system according to embodiments of this invention.

Referring now to FIG. 3, a flow chart illustrates an embodiment of steps that may be performed by a propulsion controller, such as the controller 14. In step 72, the vehicle is activated because the operator wants to drive the vehicle. In step 74, a propulsion controller, such as controller 14, assesses whether or not all energy sources are adequately resourced. Non-limiting examples of this may include assessing the amount of energy a battery holds in charge, the quantity of hydrogen and/or the quantity of gaseous hydrocarbon fuel in a storage vessel, and the quantity of gasoline in a storage vessel.

If all energy sources are adequately resourced, that is to say have at least some energy or fuel to energize the respective propulsion component for a period of time, the process moves to step 76 in which a decision parameter is assessed. In certain embodiments, a non-limiting example of the decision parameter is a relative expense of gasoline versus hydrogen versus electricity and/or gaseous non-hydrogen fuel, like gaseous hydrocarbons. It is understood that other decision parameters may be selected. Further illustrative examples of such alternate decision parameters include the quantity of a carbon footprint or a cost of a carbon tax. The carbon footprint refers to the amount of carbon emitted by various processes in producing the power necessary for propulsion. Data for the decision parameters in step 76 may be input by the driver using a human-machine interface well known in the art or drawn from a data table accessible to the control system.

In step 74, if the decision regarding adequately resourced energy sources is "no", the process moves to step 78 where the decision is made as to whether hydrogen, other gaseous fuels and/or batteries can be charged from an electrical grid and/or other energy supply external to the vehicle. It is further understood that other energy supplies may be used independently or in conjunction with the grid. Examples of the energy supplies may include, but are not limited to, a propane tank and a natural gas pipeline. While embodiments of this invention conceive of a recharging point at a household, it is understood that multiple access points for electricity and gaseous non-hydrogen fuel may be available depending on how the vehicle is configured. Non-limiting examples of such access points include commercial and industrial sites, and retail electricity outlets.

If the answer to step 78 about the availability of recharge is "yes", then at step 80, the vehicle is plugged into the grid, and the electrolyzer is used to charge the battery and provide hydrogen. While this figure illustrates using hydrogen as the fuel source, other gaseous fuels including blends with hydrogen, may also be considered. At each of the steps 78, 80, and 82 without departing from the spirit of the invention. Optionally, gaseous fuels may be provided using a gaseous fuel compressor. It is understood that the gaseous fuel compressor may be positioned on the vehicle and/or external to the vehicle, such as in a household garage. It is understood that additional considerations such as available time between operations and the availability of sufficient electrical current may be included in the decision parameters for step 78 without violating the spirit of this invention.

When at step 76 it is determined that gasoline is not less expensive than hydrogen or electric power, then in step 82 the decision is made whether to use the engine 20 with hydrogen or use the battery 36. If at step 76, it is determined that gasoline is less expensive than hydrogen or electric power, then the decision in step 84 is made to use the engine 10 fueled by gasoline. Also in step 84, there is an input from step 78 when hydrogen and/or the batteries cannot be recharged from a grid. The default selection then is to use the gasoline-fueled internal combustion engine 84.

At step 86 any of the propulsion systems may be in use. The question is asked, "is the drive completed?" If the drive is not completed, the decision tree causes the process to loop back to reviewing the resources available in step 74. If the drive is completed as indicated in step 88, the process is returned to step 72 until the operator wants to drive again.

Figure 4:
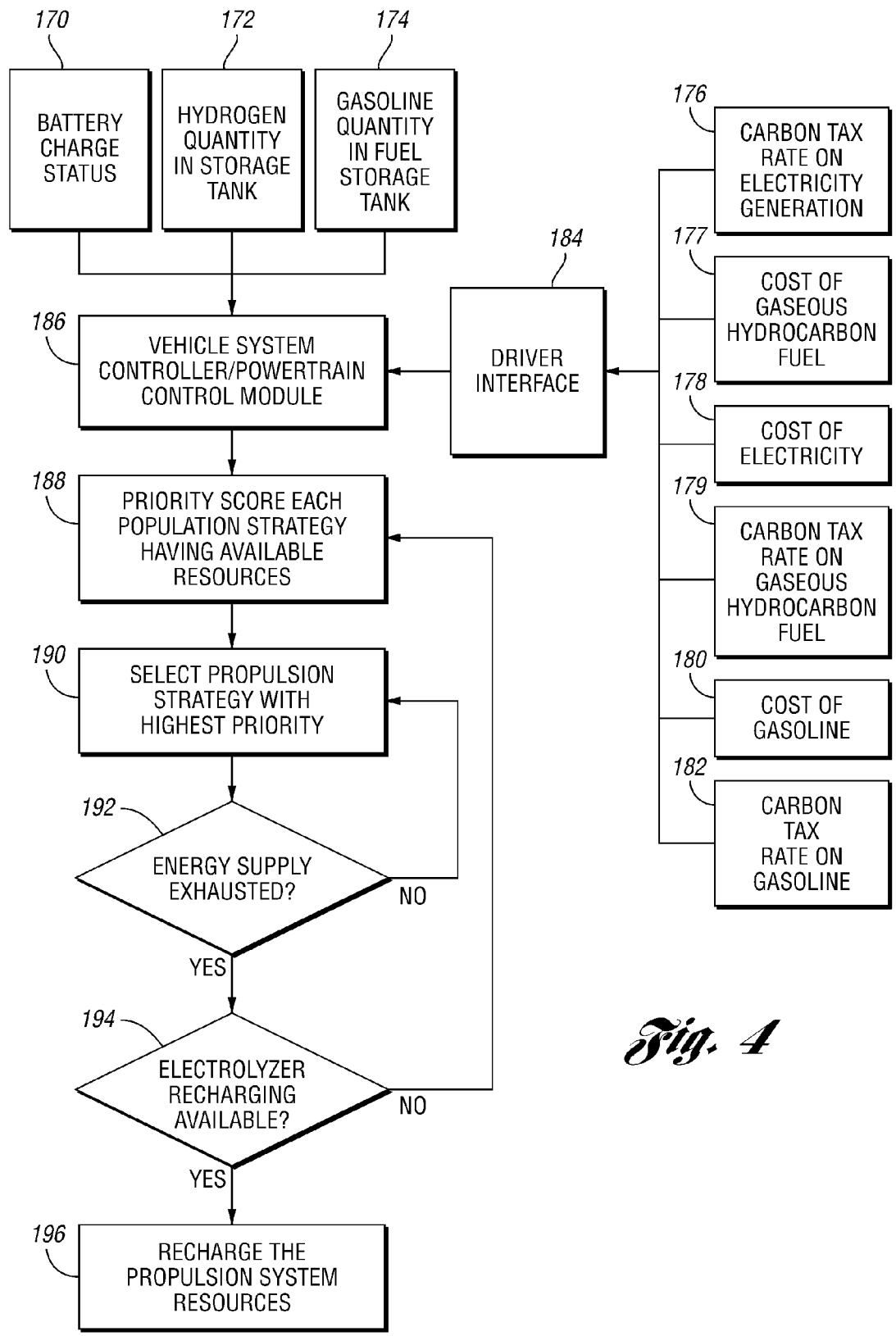
FIG. 4 illustrates a flow chart for embodiments of an application logic of this invention.

Referring now to FIG. 4, a flow chart is illustrated for certain embodiments of applications of this invention. In this non-limiting embodiment at step 170 a battery charge status is measured indicating the amount of charge available in the battery, such as the battery 36 illustrated in FIG. 1.

Further, in this embodiment, in step 172, the quantity of hydrogen in the storage tank is measured. It is understood that while hydrogen is indicated in this figure, other gaseous products may be used without violating the spirit of this invention. Examples of the gaseous products may include, but are not limited to, gaseous hydrocarbons like propane butane, and natural gas, as well as blends of the gaseous hydrocarbon with gaseous hydrogen. In step 174, the quantity of gasoline in the gasoline storage tank is measured. Information provided by a driver may include cost information, such as the carbon tax rate on electricity generation in step 176, a cost of gaseous hydrocarbon fuel 177, the cost of electricity in step 178, a cost of carbon tax on gaseous hydrocarbon fuel 179, a cost of gasoline in step 180, and a cost of carbon tax rate on gasoline in step 182. Some or all of these data 176, 177, 178, 179, 180 and 182, may be provided by the driver through a driver interface device 184. This information and the data from some or all of the steps 170, 172, 174 may be provided to the vehicle system controller and powertrain control module at step 186. At step 188, the vehicle system controller and powertrain control module, such as the controller 14 in FIG. 1, uses an algorithm to determine a priority score for each propulsion strategy having available resources.

In step 190, the algorithm selects a propulsion and fuel strategy with the highest priority and available resources and the drive begins. The selection may be made based on a predetermined factor. Non-limiting examples of the factor may include a cost of a vehicle operation, an environmental impact of the vehicle operation, or an availability of a re-energizing/re-fueling source.

In step 192, there is a need to assess whether or not the energy supply is depleted for the combination of propulsion component and fuel strategy in use. If the decision is made that the energy supply is not exhausted, the drive continues. If the decision is made that the energy supply is exhausted, the next step 194 determines whether or not an electrolyzer recharging station is available. Here, availability includes at least the presence of a physical facility and/or a sufficient amount of time for recharging. It is understood that other energy supplies may also be used to recharge respective sources, and may be used independently or cooperatively with the electrolyzer in step 194. If the recharging station is not available, then the algorithm chooses the next highest priority propulsion strategy having available resources by looping back to step 188. In various embodiments, the propulsion strategy is selected from a group of short-range energy sources. If no short-range energy sources are available, a long-range strategy may be selected.

If electrolyzer recharging is available in step 194, recharging of the propulsion system resources is performed at step 196. During the recharging, the battery charge may be increased and monitored in step 170, and the quantity of hydrogen gas stored may be increased as monitored in step 172.

In certain embodiments the controller may use a calibration algorithm in step 192 that receives an "almost-empty" signal from one of the energy sources in current use. The calibration algorithm then may provide calibration data for the next highest priority propulsion component. This preliminary provision of calibration data may assist the vehicle in making a smooth transition between propulsion components and/or fuel/energy sources. The smooth transition may assure that the driver remains relatively unaware of the transition.

While the best mode for carrying out the invention has been described in detail, those familiar with the art to which this invention relates will recognize various alternative designs and embodiments for practicing the invention as defined by the following claims.

What is claimed:

1. A propulsion system for a vehicle having a plurality of wheels, the propulsion system comprising:
   a first torque producing arrangement including an electric machine operable to provide torque to at least one of the vehicle wheels;
   a second torque producing arrangement including an engine operable to provide torque to at least one of the vehicle wheels;
   a first energy source configured to supply electrical energy to the electric machine;
   a second energy source configured to supply gaseous fuel to the engine;
   a hydrogen production system connected to the second energy source and having a connection point for receiving electrical energy from an electricity grid external to the vehicle, the production system including an electrolyzer, a water source, and a hydrogen dispensing and loading system, the hydrogen dispensing and loading system being configured to provide hydrogen to the second energy source from the electrolyzer when the electrolyzer produces hydrogen from water received from the water source;
   a third energy source configured to supply a non-hydrogen fuel to the engine; and
   a control system operatively connecting to the first and second torque producing arrangements and including at least one controller, the control system being configured to select at least one of the torque producing arrangements to drive the vehicle and at least one of the fuels to be supplied to the engine when the second torque producing arrangement is chosen.

2. The propulsion system of claim 1 wherein the control system further includes a first algorithm to minimize the use of the internal combustion engine with the non-hydrogen fuel.

3. The propulsion system of claim 1, wherein the control system processes a first signal indicating a quantity of gaseous fuel available from the second energy source.

4. The propulsion system of claim 3, wherein the control system processes a second signal indicating a quantity of energy available from the first energy source or a quantity of non-hydrogen fuel available from the third energy source.

5. The propulsion system of claim 4, wherein the control system receives a first input indicating a price of the non-hydrogen fuel and a second input indicating a price of an energy source selected from the group including electricity from the electricity grid and a gaseous hydrocarbon fuel, the control system further including an algorithm capable of selecting the least expensive torque-producing arrangement for which energy is available from at least one of the energy sources.

6. The propulsion system of claim 4, wherein the control system includes an algorithm capable of selecting a combination of the torque producing arrangement and the energy source used in order to minimize a carbon tax incurred during vehicle operation by selecting the combination for which the energy source is available that incurs the least carbon tax.

7. The propulsion system of claim 4, wherein the control system includes an algorithm capable of selecting a combination of the torque producing arrangement and the energy source to minimize a carbon footprint of the vehicle during vehicle operation.

8. The propulsion system of claim 7, wherein the algorithm selects the combination of the torque producing arrangement and the energy source to minimize the carbon footprint by selecting between the combinations of electricity for the electric motor only, only a gaseous fuel for the engine, a blended fuel of gaseous fuel and the non-hydrogen fuel for the engine, or only the non-hydrogen fuel for the engine.

9. The propulsion system of claim 1, wherein the control system receives a signal indicating that a first combination of torque producing arrangement and energy source currently selected for the vehicle is depleted, and selects a second combination of torque producing arrangement and energy source to provide propulsion.

10. The propulsion system of claim 1, wherein the electrolyzer is secured to the vehicle and is connectable to the electricity grid.

11. The propulsion system of claim 1, wherein the electrolyzer is positionable in a building.

12. A vehicle propulsion system having selectable energy sources, the propulsion system comprising:
    a first propulsion component having an electric drive motor operable to provide torque to at least one wheel of the vehicle, the first propulsion component being selectably connected electrically to at least a first energy source capable of receiving electrical energy;
    a second propulsion component having an internal combustion engine connected to a second energy source, including a hydrogen storage tank capable of supplying hydrogen for fueling the engine, the second propulsion component further being connected to a third energy source including a fuel tank for a non-hydrogen fuel capable of fueling the engine; and
    a control system having a logic block and a controller, the controller being adapted to select a combination including at least one of the propulsion components and at least one of the energy sources as determined by the logic block, the combination selected from a group including at least three combinations selected independently from the electric motor energized by a battery, the electric motor energized by a fuel cell, the electric motor energized by both the fuel cell and the battery, the internal combustion engine fueled by hydrogen, the internal combustion engine fueled by a blend of hydrogen and a non-hydrogen fuel, the internal combustion engine fueled by a blend of hydrogen and a gaseous hydrocarbon, or the internal combustion engine fueled only by the non-hydrogen fuel.

13. The propulsion system of claim 12, wherein the logic block includes an algorithm providing a priority score that scores the combinations to provide at least a first scored combination and a second scored combination using a predetermined factor and provides a priority sequence to the controller, wherein the first scored combination has the higher priority score relative to the second scored combination.

14. The propulsion system of claim 13, wherein the controller receives from a driver interface a signal providing data to the logic block.

15. The propulsion system of claim 14, wherein the signal includes the price of at least one non-hydrogen fuel.

16. The propulsion system of claim 13, wherein the logic block instructs the controller to select the second scored combination when the first scored combination is depleted.

17. The propulsion system of claim 16, wherein the control system provides a signal to the propulsion component of the second combination to calibrate the propulsion component for operation before the first combination is depleted.

18. A method for using a vehicle propulsion system with selectable energy sources, the method comprising:
   quantifying a quantity of energy available for at least a first short-range energy source and a second short-range energy source;
   selecting a first algorithm for ranking of at least three combinations of propulsion component and energy sources, the energy sources including the first and second short-range sources;
   determining priorities of use of the combinations of propulsion components and the short-range energy sources using the first algorithm;
   selecting using a control system, a first propulsion component and the energy source combination, the selection being made in priority order based on the first algorithm;
   starting a vehicle using the first combination;
   driving until the first combination is depleted;
   selecting and changing to a second combination having the next highest priority based on the first algorithm;
   driving the vehicle until the second combination is depleted; and
   re-energizing the short-range energy sources by connecting the vehicle to at least one energy source including an energy supply external to the vehicle.

19. The method of claim 18, further including selecting and changing to a third combination including a long-range energy source.

20. The method of claim 18, wherein selecting the combination of propulsion component and energy source includes scoring the energy source using a second algorithm.

* * * * *